United States Patent
Day

(10) Patent No.: US 9,201,575 B2
(45) Date of Patent: Dec. 1, 2015

(54) METHOD AND SYSTEM FOR DATABASE BROWSING

(75) Inventor: Brian A. Day, Birmingham, MI (US)

(73) Assignee: General Motors LLC, Detroit, MI (US)

( * ) Notice: Subject to any disclaimer, the term of this patent is extended or adjusted under 35 U.S.C. 154(b) by 543 days.

(21) Appl. No.: 13/347,489

(22) Filed: Jan. 10, 2012

(65) Prior Publication Data

US 2013/0179807 A1 Jul. 11, 2013

(51) Int. Cl.
*G06F 3/048* (2013.01)
*G06F 3/0484* (2013.01)
*G06F 17/30* (2006.01)
*G06F 3/00* (2006.01)

(52) U.S. Cl.
CPC ...... *G06F 3/04842* (2013.01); *G06F 17/30392* (2013.01); *G06F 17/30572* (2013.01)

(58) Field of Classification Search
CPC .............. G06F 17/30; G06F 17/30595; G06F 17/30011
USPC .................. 715/205, 227, 234, 764, 810, 854
See application file for complete search history.

(56) References Cited

U.S. PATENT DOCUMENTS

| | | | |
|---|---|---|---|
| 6,502,092 B1 | 12/2002 | Ensor | |
| 6,609,122 B1 | 8/2003 | Ensor | |
| 8,250,158 B2 * | 8/2012 | Arnold et al. | 709/206 |
| 8,423,565 B2 * | 4/2013 | Redlich et al. | 707/758 |
| 8,447,829 B1 * | 5/2013 | Geller et al. | 709/217 |
| 8,468,244 B2 * | 6/2013 | Redlich et al. | 709/225 |
| 8,648,875 B2 * | 2/2014 | Hamilton et al. | 345/619 |
| 2005/0216421 A1 * | 9/2005 | Barry et al. | 705/64 |
| 2008/0154873 A1 * | 6/2008 | Redlich et al. | 707/5 |
| 2009/0018996 A1 * | 1/2009 | Hunt et al. | 707/2 |
| 2009/0031230 A1 * | 1/2009 | Kesler | 715/764 |
| 2009/0089678 A1 * | 4/2009 | Sacco et al. | 715/733 |
| 2010/0069035 A1 * | 3/2010 | Johnson | 455/404.1 |
| 2010/0306249 A1 * | 12/2010 | Hill et al. | 707/769 |
| 2012/0110515 A1 * | 5/2012 | Abramoff et al. | 715/854 |

* cited by examiner

*Primary Examiner* — Nicholas Augustine

(74) *Attorney, Agent, or Firm* — Dierker & Associates, P.C.

(57) ABSTRACT

A method of enabling browsing of database tables on a computer system includes providing a configuration file to identify database table characteristics and to develop a graphical user interface (GUI) in communication with a database. The method further includes displaying on the GUI a main screen including: a record as a row from a specified database table; a related database table name, the table name being related to the specified database table; and a detail as a value in a column from the specified database table for the record displayed. The method still further includes receiving a selection from the GUI of the table. The method also includes navigating to another main screen on the GUI in response to the selection from the GUI.

16 Claims, 5 Drawing Sheets

METHOD AND SYSTEM FOR DATABASE BROWSING

TECHNICAL FIELD

The present disclosure relates generally to methods and systems for browsing databases.

BACKGROUND

Databases are commonly used to manage volumes of information. The data may be organized into tables, and the tables may be related in some predefined manner. A user may answer questions by analyzing data in the database. Answering some questions may involve analyzing data in an aggregate sense, for example finding a sum, average, or maximum. Answering other questions may involve finding a particular record in the database and considering information that is related to the particular record. Typically, data is analyzed by performing one or more queries against the database to manipulate the data into a scope and form that answers the question. The question may be routine, for example, a quarterly report may require periodic updates on sales figures. The answers to such routine questions may be provided by running a preprogrammed series of queries. Other questions may be relatively unique, such that anticipating the questions, preprogramming queries to answer the questions, and providing a method for a user to access the preprogrammed queries may be difficult. Such questions may be answered by an expert user who applies knowledge of the structure of the database and query programming to run specific queries.

SUMMARY

A method of enabling browsing of database tables on a computer system includes providing a configuration file to identify database table characteristics and to develop a graphical user interface (GUI) in communication with a database. The method further includes displaying on the GUI a main screen including: a record as a row from a specified database table; a related database table name, the table name being related to the specified database table; and a detail as a value in a column from the specified database table for the record displayed. The method still further includes receiving a selection from the GUI of the table. The method also includes navigating to another main screen on the GUI in response to the selection from the GUI.

A system for accomplishing the same is also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
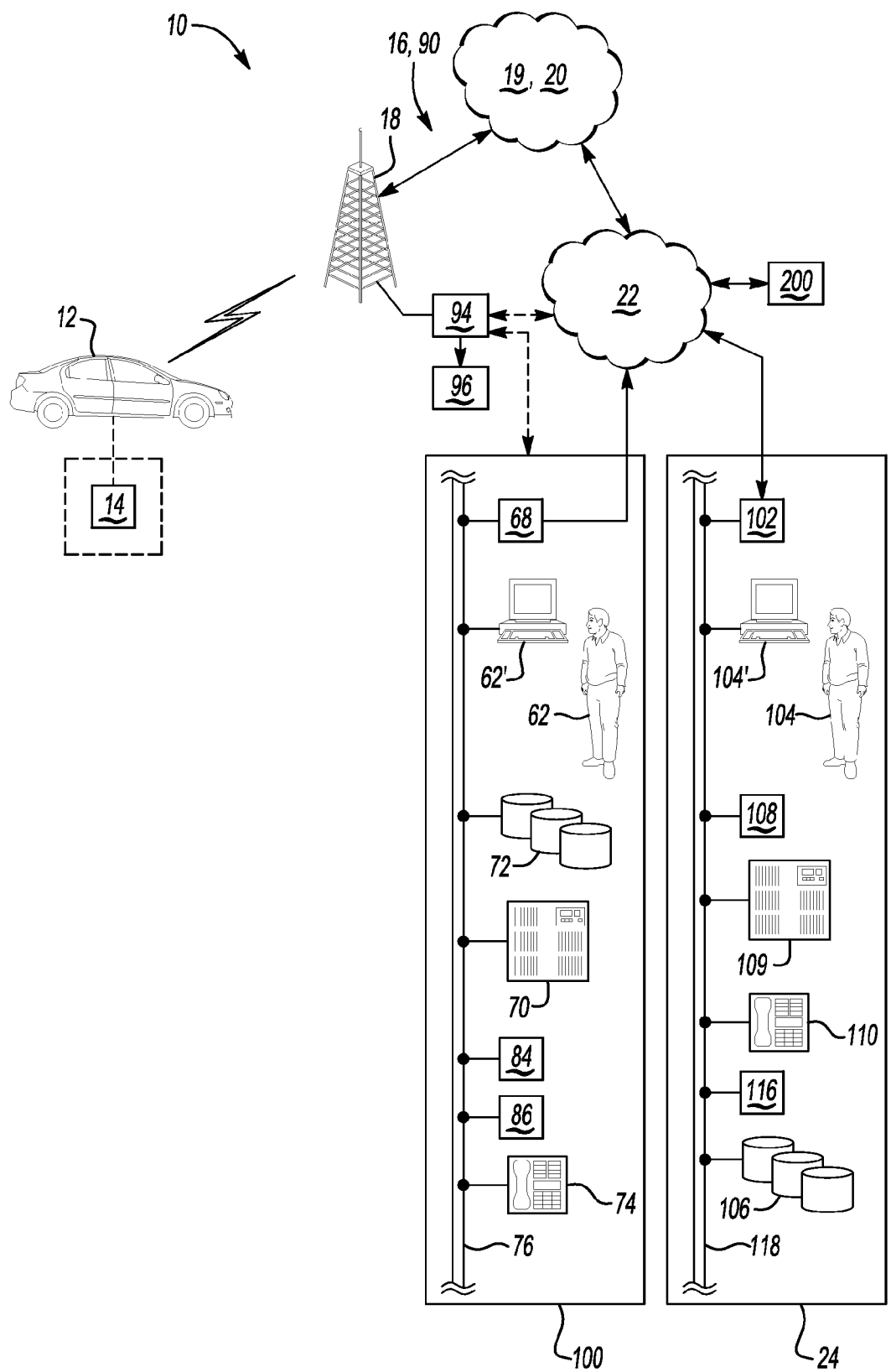
FIG. 1 is a schematic diagram depicting an example of a system for servicing a subscriber vehicle, including an example of a system for database browsing according to the present disclosure.

Database systems or methods may allow access to large databases for analysis of information therein. With some database systems, an information user or investigator may need to know details of the database contents such as the exact spelling of table or column names, primary keys of a table, and underlying relationships in the database in order to efficiently search within the database to find an answer to a question. A high-level understanding of Structured Query Language (SQL) syntax and detailed knowledge of certain intricacies within the database may be applied to create queries for answering questions. Individual record searching and exploration of related records may sometimes use knowledge of underlying relationships between sub-sections of databases that do not have explicit linkages in the database. For example, a table that includes global time zone information may be related to a table that includes customer address information, but the relationship between the tables may not have been included in the database metadata. A user with knowledge that both the time zone table and the address table are in the database, and with knowledge of how the tables are indexed, could apply that knowledge to determine in which time zone a customer lives.

It is believed that the system and method disclosed herein eliminate the need for a database user to remember the exact spelling of table or column names, to look up the primary keys of a table, to memorize the underlying relationships in a database, and to know SQL syntax.

Examples of the system and method according to the present disclosure may be used to answer a question such as "Why did we have trouble delivering service X to customer Y?" Such a question may be contrasted with "How many customers were unable to receive service X on day Z?" which may be efficiently handled by a traditional database query or report. Similarly, traditional database queries and reports may be suitable for a data mining task such as answering the question "Is there some new service we should be delivering to our customers?" Traditional database query and reporting techniques may be suitable for querying a database in the aggregate, and summarizing the results. However, examples according to the present disclosure may be used to investigate details of some particular record of interest by navigation of related records in a database.

Similar to an internet browser, which allows a user to "surf" by clicking on hyperlinks to navigate between pages and sites, examples according to the present disclosure allow a database user to surf databases by clicking on hyperlinks that show the contents of a record and that navigate to related records. The examples disclosed operate on the database in a read-only mode; the examples do not allow the user to modify the database content being viewed. For example, inserting, updating, and deleting database content is not allowed by the user in the disclosed system and method. Implementation of the present disclosure may be browser based, but need not be. Examples of internes browsers include Microsoft® Internet Explorer®, Mozilla® Firefox®, Opera™, etc. Other suitable implementations may utilize GUIs native to a workstation operating system, for example a Microsoft Windows® based GUI, a Linux based X Window System GUI, etc.

Examples according to the present disclosure allow a user to navigate the database with little knowledge of an underlying business and without the user creating application programming. Implementation of the system and method of the present disclosure may be operable with databases used for many different purposes. In an example, a database is used in providing goods and/or services to a vehicle. In the example, connection via a telematics unit of a subscriber vehicle provides for communication of a packet data message from the telematics unit to a telematics service center. A subscriber vehicle may establish a wireless connection with a communications device at the third party facility, and through this connection, send vehicle information to a back office of a telematics service provider using an internes protocol address of the third party facility. The back office utilizes the vehicle information to identify the vehicle, and the internet protocol address to identify the third party facility. With such identification information, the back office notifies the third party facility that the vehicle is waiting for service, and may, in some instances, provide information that may be usable by the third party facility to effectively and efficiently service the vehicle.

The information provided to the third party facility may include the make, model, year, and/or color of the vehicle waiting for service, and perhaps any preferences pertaining to how the vehicle is to be serviced. In some instances, the back office also provides payment information to the third party facility, which may be used to pay for the goods/services rendered to the subscriber vehicle. It is to be understood that other implementation environments are possible, and discussed here is just one example.

Further to this example and others, referring now to FIG. 1, an example of a system 10 for servicing a subscriber vehicle includes a vehicle 12, a carrier/communication system 16 (including, but not limited to, one or more cell towers 18, one or more base stations 19 and/or mobile switching centers (MSCs) 20, and one or more service providers (e.g., 90) including mobile network operator(s)), one or more land networks 22, one or more data centers 100, one or more application centers 24 (which may also be referred to as an application specific call center), and one or more third party facilities 200. In an example, the carrier/communication system 16 is a two-way radio frequency communication system, and may be configured with a web service supporting system-to-system communications (e.g., communications between a telematics application center 24 and the service provider 90).

The wireless carrier/communication system 16 also includes a host server 94 including suitable computer equipment (not shown) upon which information of a remotely accessible page 96 resides/is stored. For instance, the remotely accessible page 96 may be a webpage set up and maintained by a telematics service provider, and the user may access the page 96 by, e.g., submitting personal information (e.g., a login ID) and authenticating information (e.g., a password, a PIN, etc.). The computer equipment used to log into the page 96 may also include hardware which, for example, can receive and read a smart card for identification/authentication purposes, or can utilize biometrics for identification/authentication purposes.

Vehicle 12 may be a mobile land vehicle (such as a motorcycle, car, truck, recreational vehicle (RV), or the like), a water vehicle (such as a boat) or an air vehicle (such as a plane, helicopter, or the like), and the vehicle 12 is equipped with suitable hardware and software that enables it to communicate (e.g., transmit and/or receive voice and data communications) over the carrier/communication system 16. Vehicle 12 includes a telematics unit 14 and other components operatively connected thereto. Collectively, the vehicle 12 enables a user to communicate with the telematics unit 14 and any other components in communication thereto.

As mentioned above, the system 10 includes the carrier/communication system 16. A portion of the carrier/communication system 16 may be a cellular telephone system or any other suitable wireless system that transmits signals between the vehicle 12 and land network 22. According to an example, the wireless portion of the carrier/communication system 16 includes one or more cell towers 18, base stations 19 and/or MSCs 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the wireless portion of the system 16, it could be incorporated within an MSC 20 or some other network components as well.

Land network 22 may be a conventional land-based telecommunications network that is connected to one or more landline telephones and connects the wireless portion of the carrier/communication network 16 to the telematics data center 100 and/or application center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks, such as wireless local networks (WLANs) or networks providing broadband wireless access (BWA), or any combination thereof. Communications between i) the vehicle 12 and the telematics service center (24 and/or 100) and/or ii) the third party facility 200 and the telematics service center (24 and/or 100) may be established through the land network 22. The network 22 may also take the form of a virtual private network (VPN), Internet network, or a wide area network (WAN). In some instances, it may be desirable to use a private wired network, such as an Intranet network.

Data center 100 is designed to provide the vehicle 12 with a number of different system back-end functions. Generally, the data center 100 receives voice and/or data calls, analyzes requests associated with the voice or data calls, and, in some cases, transfers the calls to an application specific call/service center (such as the application center 24 shown in FIG. 1, which will be described in detail below). The data center 100 is also in selective and operative communication with the application center 24 via the wireless carrier/communication system 16 or via a wired connection. Additionally, for purposes of the instant disclosure, the data center 100 is in selective and operative communication with the third party facility 200.

According to the example shown here, the data center 100 generally includes one or more switches 68, servers 70, databases 72, live and/or automated advisors 62, 62', processing equipment (or processor) 84, a communications module 86, as well as a variety of other telecommunication and computer equipment 74 that is known to those skilled in the art. These various telematics service provider components are coupled to one another via a network connection or bus 76. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle also has a network connection that enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device. In an example, the telematics unit 14 is linked to the telematics service center (e.g., the data center(s) 100 and the application center(s) 24) via the carrier system 16, and is capable of calling and transmitting data to the telematics data center(s) 100 and/or the application center(s) 24. The telematics unit 14 provides numerous services alone or in conjunction with the telematics service center (e.g., the data center 100 and/or the application center 24), some of which may not be listed herein, and is configured to fulfill one or more user or subscriber requests. Several examples of these services include, but are not limited to: turn-by-turn directions and other navigation-related services; airbag deployment notification and other emergency or roadside assistance-related services; and infotainment-related services (including for example the provision of music, Web pages, movies, television programs, videogames and/or other content downloaded and stored for current or later playback). Again, the above-listed services are by no means an exhaustive list of all the capabilities of telematics unit 14, but are simply an illustration of some of the services that the telematics unit 14 is capable of offering.

The processor 84, which is often used in conjunction with the computer equipment 74, is generally equipped with suitable software and/or programs enabling the processor 84 to accomplish a variety of data center 100 functions. Further, the various operations of the data center 100 are carried out by one or more computers (e.g., computer equipment 74) programmed to carry out some of the tasks of the data center 100. The computer equipment 74 (including computers) may include a network of servers (including server 70) coupled to both locally stored and remote databases (e.g., database 72) of any information processed.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder and can be connected to various devices such as the server 70 and database 72.

The application center 24 may be a dedicated facility for managing and handling transmissions related to particular services, such as emergency services, navigation services, third party facility transaction services, etc. In an example, the application center 24 is a third party facility transaction services application center. In this example, upon receiving packet data from the telematics unit 14, the switch 68 at the data center 100 routes the packet data to the switchboard 102 at the third party transaction services application center 24 (which may also be a website application center including a third party facility transaction services division), and then the packet data is routed by the switchboard 102 to, e.g., a processor 108. The processor 108 analyzes the data in the transmission, and retrieves appropriate information contained in a user profile stored in one of the databases 106 at the application center 24. This information may ultimately be transmitted to the third party facility 200 (e.g., to a server associated with the third party facility 200) for use in providing service(s) to the vehicle 12.

Referring back to the description of the data center 100, the database(s) 72 may be designed to store subscriber profile records, subscriber behavioral patterns, or any other pertinent subscriber information. In an example, the database(s) 72 may be configured to store the user profile mentioned above, which may contain personal information of the subscriber (e.g., the subscriber's name, garage address, billing address, home phone number, cellular phone number, etc.), as well as subscriber selected preferences (e.g., restrictions on certain services that may be provided to the vehicle 12, favorites related to a particular service, etc.). All or selected portions of the user profile may be transmitted from the data center 100 to the third party facility 200 when services are desired by the vehicle 12, and such information contained in the user profile may be used to assist with servicing the vehicle 12.

It is to be understood that the databases 72 may allow the data center 100 to function as a repository for data collected from the telematics unit 14 and/or from the application center 24. In some instances, another facility may function as a repository for collected data (e.g., a lab (not shown) associated with the application center 24 and/or the data center 100).

The communications module 86 at the data center 100 is configured, via suitable communications equipment (such as equipment capable of handling messaging between the data center 100 and the telematics unit 14 (e.g., switches, switchboards, etc.), modems (e.g., a wireless modem), TCP/IP supporting equipment, and/or the like), to enable the data center 100 to establish a communication with, for example, the telematics unit 14, or visa versa. The communications module 86 is also configured to enable the data center 100 to establish a communication with the third party facility 200. In an example, the communications module 86 receives packet data from the telematics unit 14, and the packet data may include, for instance, vehicle data representing a then-current location of the subscriber vehicle 12 that is within proximity of the third party facility 200, and data indicating that the vehicle 12 is available for servicing. Upon receiving the packet data, the communications module 86 unpacketizes the data. The communications module 86 identifies that the data pertains to a particular subscriber vehicle 12 and that the vehicle 12 will be requesting services from the third party facility 200, and then transmits the data to, e.g., the processor 84. The processor 84 may run computer readable code/software routines that can receive the data and determine what information should be sent back to the third party facility 200 so that the facility 200 can use the information to effectively and efficiently service the vehicle 12. In some instances, the communications module 86 may also transmit, for example, credentials necessary for the third party facility 200 to directly connect with the vehicle 12.

It is to be appreciated that the data center 100 may be any central or remote facility, manned or unmanned, mobile or fixed, to or from which it is desirable to exchange voice and data communications. As such, the live advisor 62 may be physically present at the data center 100 or may be located remote from the data center 100 while communicating therethrough.

As mentioned above, the application center 24, which is in selective and operative communication with the data center 100, is a dedicated facility for addressing specific requests, needs, or the like of the user, the data center 100, the third party facility 200, or combinations thereof. In an example, several application centers 24 may be associated with the data center 100, where each application center is designed to address the specific request, need, etc. Examples of the application centers 24 include emergency service centers, navigation route centers, third party facility service centers, or the like.

As shown in FIG. 1, the application center 24 may include the switchboard 102, databases 106, live and/or automated advisors 104, 104', the processor 108, a server 109, as well as a variety of other telecommunication and computer equipment 110 that is known to those skilled in the art. In some instances, the application center 24 may also include various modules, such as communications module 116. In these instances, the modules at the application center 24 may be used to perform the functions described above for the module 86 at the data center 100. These various application center components are coupled to one another via a network connection or bus 118, such as one similar to the data center bus 76 described above.

Switchboard 102, which may be a private branch exchange (PBX) switch, routes incoming signals so that voice transmissions (e.g., voice calls) are usually sent to either the live advisor 104 or the automated response system 104', and data transmissions (e.g., packetized voice communications) are passed on to a modem or other piece of equipment (not shown) for demodulation and further signal processing. The modem preferably includes an encoder and can be connected to various devices such as the server 109 and database 106.

The database(s) 106 may be designed to store a variety of information usable by the application center 24. When the application center 24 is a navigation route service center, the database(s) 106 may store various routes and/or points of interest often requested by a particular user. When the application center 24 is a third party facility transactions service center, the database(s) 106 may be designed to store user profiles, such as the user profile mentioned above.

Referring back to the general functions of the application center 24, it is to be understood that similar to the data center live advisor 62, the application center live advisor 104 may be physically present at the application center 24 or may be located remote from the application center 24 while communicating therethrough.

The data center 100 and/or application center 24 components shown in FIG. 1 may also be virtualized and configured in a Cloud Computer, that is, in an Internet-based computing environment. For example, for the application center 24, the computer equipment 110 may be accessed as a Cloud platform service, or PaaS (Platform as a Service), utilizing Cloud infrastructure rather than hosting computer equipment 110 at the application center 24. The database 106 and server 109 may also be virtualized as a Cloud resource. The Cloud infrastructure, known as IaaS (Infrastructure as a Service), typically utilizes a platform virtualization environment as a service, which may include components such as the processor 108, database 106, server 109, and computer equipment 110.

In an example, application software and services (such as, e.g., navigation route generation and subsequent delivery to the vehicle 12) may be performed in the Cloud via the SaaS (Software as a Service). Subscribers, in this fashion, may access software applications remotely via the Cloud. Further, subscriber service requests may be acted upon by the automated advisor 62', which may be configured as a service present in the Cloud.

The communications network provider 90 generally owns and/or operates the carrier/communication system 16. The communications network provider 90 includes a mobile network operator that monitors and maintains the operation of the communications network 90. The network operator directs and routes calls, and troubleshoots hardware (cables, routers, network switches, hubs, network adaptors), software, and transmission problems. It is to be understood that, although the communications network provider 90 may have back-end equipment, employees, etc. located at the data center 100 and/or application center 24, the data center and/or application center is/are a separate and distinct entity from the network provider 90. In an example, the equipment, employees, etc. of the communications network provider 90 are located remote from the data center 100 and/or application center 24. The communications network provider 90 provides the user with telephone and/or Internet services, while the data center 100 and/or application center 24 provides a variety of telematics-related services (such as, for example, those discussed hereinabove). The communications network provider 90 may interact with the data center 100 and/or application center 24 to provide services (such as emergency services) to the user.

In the examples of the system and method disclosed herein, the third party facility transactions service center may be managed by the data center 100. However, it is to be understood that the data center 100 may not be the sole entity that manages the transactions services, and the application center 24 may the designated entity for managing the third party facility transactions services.

An example of the system and method as disclosed herein is a CGI (Common Gateway Interface, i.e., web-based) program that generates its display on-the-fly, based on user interaction. When invoked, the system and method read metadata in the database to ascertain details of the structure of that database. As used herein, the term "metadata" means a set of system tables that describe the structure of application tables. For example, metadata may list the columns in a table, describe a data type in each column and describe a size of each column. As such, metadata is data about the structure that contains data. In particular, the system and method use the metadata to determine the name(s) of column(s) contained in each table, the size and data type of each column, the primary key column(s) of each table, the foreign keys of some related tables, and the indexes on each table.

It is to be understood that primary keys are those columns in a table that uniquely identify a particular record in that table. Primary keys may also be created from a combination of two or more columns. Such primary keys are known as composite keys. Each column used to form a composite key may not necessarily be unique by itself within the database table but when combined with the other column(s) in the composite key, the combination is unique. It is to be understood that examples of the system and method as disclosed herein may utilize composite keys.

As used herein, a foreign key establishes a relationship between tables. A foreign key is a column in one table that holds the value of a primary key from some other table, indicating that the two rows are related. A foreign key is not necessarily unique in the table that stores the foreign key, but the foreign key points to a unique value in the referenced table.

An index is an additional set of data, stored apart and in addition to a table, which improves the speed of data retrieval operations. For example, rows in a customer table might be uniquely identified by a customer ID number, and so that column would be the primary key on that table. Often, when rows are read from the database, they are accessed by the primary key in response to a query such as "Show me the name of customer #4134". If the user of a database application also needs to rapidly access data by some other identifier, such as the city in which the customer resides, the user can instruct a DBMS (Database Management System) to create an additional index on the customer table using the City field. Such an index would then contain information such as "The customers located in Albany are customers #1944, 2088, and 2095. The customers located in Birmingham are customers #5500, 5508 and 9976".

The system and method rely on database metadata when displaying a record, rather than relying on application code or a user supplied configuration. Using this approach allows the system and method to build a GUI display that can explore the full contents of a database with no application programming by the user. A system requiring application programming may, for example, require a user to develop GUI displays and pre-write screens with menus. Examples according to the present disclosure augment the display of database information by a configuration file, developed by a database administrator enabling a user to navigate the database.

The system and method may work on any vendor-supplied DBMS, including, for example, by reading a database such as that available from Oracle® like MySQL™; DB2® from IBM®; Access® from Microsoft®; and from Sybase®. DBMSs may be referred to as tools that are used to manipulate the data in a database that holds the tables, records, columns, etc. DBMSs control referential integrity. Referential integrity is a concept in which a DBMS keeps track of primary and foreign key relationships to ensure that each foreign key actually links to a valid value in another table. When referential integrity is enforced, all foreign keys are properly matched with existing data in the referenced table. For example, if Table A contains a foreign key that references a record in Table B, that record in Table B must exist.

In examples of a method according to the present disclosure, browsing of database tables on a computer system is enabled. An example of the method may provide a configuration file to include database table characteristics and to develop a GUI in communication with a database. The configuration file is predetermined as relating to the database. A database administrator develops the configuration file for a given business application. For example, a DBMS vendor (such as Microsoft®) may provide a DBMS (such as Access®). The provided DBMS may be used by a business to manage information contained in a database as driven by a business application. With the system and method as presently disclosed, software is provided to work in conjunction with the DBMS, the database itself, and also a configuration file as created to suit the needs of the business. The configuration file may be developed by a database administrator who has specialized information. The specialized information may, for example, be particular knowledge of the business application needs and understanding of relationships between tables. The database administrator may use the specialized information to customize the configuration file to a particular business need. The end user navigates through the database without having to know the specialized information (particularly the relationships within the database) because the configuration file augments the database metadata to provide a smooth interface. In an example, the interface is provided on a browser, but could be otherwise implemented.

An example GUI display may include a main screen that further may include items such as one or more records and a series of details. A record is a row from a specified database table. The series of details may include all of the fields from columns of the specified database table corresponding to the one or more records displayed. The GUI may receive a selection of an item from the display. In response to the selection, the method may provide for navigation to another main screen on the GUI display. It is to be understood that the database information is treated as read-only during navigation of the GUI and navigation of the GUI may be, but is not necessarily, browser based.

An example configuration file according to the system and method as disclosed herein contains a database tag name that is associated with database connection information, e.g., server, user name, password, etc. The configuration file is stored as a file that may be encrypted for security purposes. A configuration file may only specify one database. In an example, the configuration file supplements relationships found in database metadata, including data that is not included in the database metadata. In order to keep the configuration file small, the specifications may be limited to information not specified in the database metadata. The configuration file may be stored alongside the application software itself on a web server. Additionally, an example according to the present disclosure may include another configuration file associated with the database. It is to be understood that a configuration file may be implemented in a single file or in a group of related files.

The configuration file may include a list of tables within a predetermined scope for display. Listing the tables that are within scope provides a way to limit the scope of the data displayed. In this way, the configuration file defines a filter for displayed information. The filter may pass predetermined tables or details. Databases may include thousands of tables and many thousands of columns. For example, about 5000 tables having a total of about 100,000 columns. A particular DBMS vendor may have a maximum number of tables. For example, with Microsoft Access®, the maximum number of tables is governed by a limit on the number of objects in the database, which includes tables, forms, reports, queries, etc. The Microsoft Access® limit on database objects is 32,768. Therefore, there could not be over 32,768 tables in the DBMS. Alternatively, Oracle® has no explicit limit to the number of tables possibly included in an Oracle® database. Limiting the scope of interest helps to make the "data model" a fixed size. As used herein, a data model is an organizational framework established for the database, targeting the relationships among the database tables, also known as an entity relationship diagram (ERD).

The configuration file may also specify "soft relationships", i.e., relationships not indicated in the database metadata by foreign key constraints. The soft relationships may include one-way relationships, redaction, programmable Uniform Resource Locators (URLs), and sort orders. Soft relationships may have been previously represented in a data model used to analyze a business application, but may have subsequently been de-normalized for performance or capacity reasons and therefore may have been removed from database metadata.

Additionally, the configuration file may include additional fields to display when listing related rows. For example, on a Customer record, the Customer ID might be the primary key and would therefore be displayed, but customer name status might an important fact of interest. In this example, while Customer records would appear in the list of related items section of the display, rather than showing a list of numbers of which the meaning may be unclear, the configuration file may cause the display of additional facts to help assist the user in decisions as to where to navigate next. Further, the configuration file may include a sort order for the GUI display. For example, a customer's vehicles may be listed in order of manufacture date or purchase date.

In an example, a method or system of enabling database browsing as disclosed herein may include displaying external hyperlinks created from information in the configuration file and in the database. These hyperlinks may be self-referential to the database or extra-referential to another database.

Internet hyperlinks are defined as URL specifications in the configuration file. Such programmable URL specifications allow data from the database to be integrated into a hyperlinked internet site URL. This allows the user to navigate to web sites that are able to use data from the current record. Examples of the system or method according to the present disclosure could extract a city name from a record and view Google® Maps™ for a satellite view of the city. Similarly, examples may extract a product serial number from a database and link to a web based diagnostic tool on the company intranet. In a further example, the system or method could use a product model name to link to a site that displays a picture associated with the model or displays a manual corresponding to the model.

Because the system and method in some examples are HTML based, a URL in the configuration file may recursively hyperlink to itself (from one URL to another URL). In such a case of a recursive hyperlink, the URL may specify that the new invocation use a different configuration file. This makes it possible to "jump" between databases, for instance, taking a phone number from a record in the customer service database and linking to a separate database of phone records in order to see all phone calls to that number. Alternatively, the target configuration file may stay in the same database but explore a different set of interrelated tables. It is to be understood that in examples of the system and method that are non-browser based, URLs would invoke a screen outside the GUI in a browser window, separate from the database browsing GUI in order to retrieve a URL.

In another example, a method or system of enabling database table browsing as disclosed herein may restrict access to sensitive information. The example may redact predetermined types of sensitive information to avoid display of certain information. For example, a credit card number used for a previous transaction may be included in a database, but the user may be restricted from viewing credit card account numbers.

In some business situations, the underlying structure of the database may change as business needs evolve. For example, the database may be revised to include a table with an additional column or may include an additional series of tables. The revised database will have metadata that reflects the changes to the database structure. It is to be understood that the configuration file need not be adapted upon a change to the underlying database since the configuration file augments the metadata and does not replace it. The configuration file may keep its underlying structure as key points with relationships established and the only modification to the overall user experience comes from the modified metadata. As such, the system and method may be self-adapting to database changes.

In still another example, a method or system of enabling database table browsing disclosed herein may include one or more one-way relationships. A one-way relationship may be specified in a configuration file and define a filter when operating on a useful source table, but other records related to information in the useful source table may not be relevant to the investigation. For example, a user looking at Fred Smith's record clicks on a related relationship into an "OH" record in a "US_State" table. Without the specified one-way relationship, the "OH" record may connect to all "OH" records, but the investigation in the example only pertains to Fred Smith. Therefore, the one-way relationship in the configuration file causes the list of all customers located in Ohio to be filtered and only the OH record related to Fred Smith may be displayed.

In yet another example, a method of enabling database table browsing may include extracting information from one or more LOBs for display of fields with large objects such as BLOBs or CLOBs. As used herein, an LOB is a large object, typically greater than 1024 bytes, storing data not easily displayed in a form-like context (e.g., videos, images, XML strings, or the text of a novel). A BLOB is a binary large object, storing unstructured binary (or "raw") data, such as video clips. A CLOB is a character large object, storing large blocks of single-byte fixed-width character data from the database character set.

An example system for enabling database browsing includes a network with a processor coupled thereto and a system memory coupled to the processor. The system memory stores one or more computer programs executable by the processor, the programs including computer readable code encoded on a non-transitory, tangible computer readable medium. The computer readable code places a GUI in selective communication with a database with one or more database tables. The code selects one of the database tables containing an item chosen from records, attributes, and relationships in response to a user input. The code selectively displays the item on the GUI and further associates a configuration file with the database. The configuration file includes instructions to: search the database metadata to establish the item; define the database tables; select the item to display; and define soft relationships for incorporation into the GUI. It is to be understood that to "establish the item" means to locate, identify and characterize the item.

The following examples are provided to illustrate aspects of the system and method disclosed herein. It is to be understood that these examples are provided for illustrative purposes and are not to be construed as limiting the scope of the disclosure.

EXAMPLES

In an example scenario, a business is managing information related to its customers and accounts in a database. A data model or ERD of a database showing some of the detail for this information management is depicted in FIG. 2.

Figure 2:
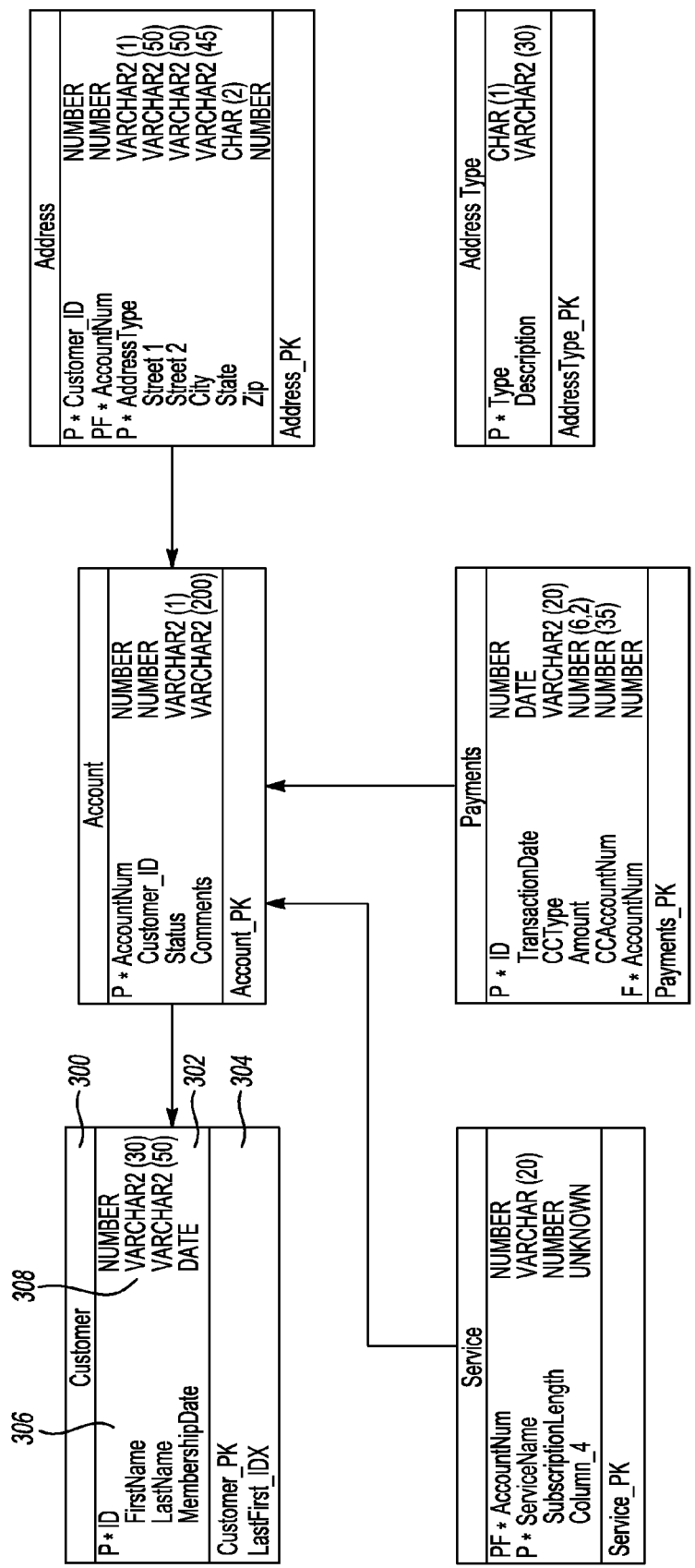
FIG. 2 is a schematic diagram depicting an example of an entity relationship diagram (ERD) according to the present disclosure.

As depicted in FIG. 2, each box represents a particular table in the database and is organized in a uniform way. The boxes are split into three portions: a top portion 300, a middle portion 302, and a bottom portion 304. Within the top portion 300 of each box is the identity of the table (e.g., Customer, Account, Address, etc.). Within the middle portion 302 of each box are the attributes 306 (representative of table columns) of each table along with the corresponding datatypes 308 for each attribute and any specified maximum byte limit following the datatype reference in parenthesis. For instance, the Customer ID is represented in the database as a NUMBER datatype. The Customer FirstName is represented by a VAR- CHAR2 datatype with a character limit of 30. The bottom portion 304 includes primary key and index information for the table.

Still referring to FIG. 2, the primary key of the table "Customer" is the ID field. The primary key attribute for the table "Customer" is designated by the letter "P" to the left of the list of attributes and in-line with the ID attribute. Relationships between tables are specified by arrows indicating foreign key constraint schemes. Here, the table "Account" has three arrows pointed to it, one arrow from each of the tables named "Service", "Payments", and "Address". The foreign key constraint is indicated by the letter "F" next to the attribute it pertains to. For example, the "Payments" table includes an attribute called "AccountNum" (with datatype "NUMBER"), which is a foreign key shown by the letter "F" to the left of "AccountNum". Therefore, associations are defined, accounted for, and represented between tables in the database.

The Customer table has an index called LastFirst_IDX comprised of the two fields LastName+FirstName. In the example, each customer may have multiple accounts. Accounts have statuses such as "O", or "C" (for open or closed, respectively). Accounts may pertain to several services, and the application tracks payments against accounts. Accounts may have multiple addresses, such as a home address and a business address. There is a table that can be used for decoding the one character "AddressType" found in an "Address" record, but there is no referential integrity between the two tables. As shown in FIG. 2, there is no arrow to or from the "AddressType" box, nor is there an "F" next to any attribute.

The example system and method for database browsing has access to all of the metadata for this database. The configuration file augments the metadata by listing the tables (referenced in the configuration file as "entities") which are of interest and provide any facts which are not evident from the metadata. A configuration file for surfing this database is very small and is shown below.

```
1    Database: CustomerDB
2
3    Entity: Customer
4    Entity: Account
5       Display: Status
6    Entity: Address
7       URL: statemap,
           http://maps.google.com/maps?q=[Zip]&z=6
8    Entity: AddressType
9    Entity: Service
10      Orderby: ServiceName
11
12   Rel: Address, AddressType,
         Address.AddressType=AddressType.Type
```

The example configuration file above shows that the Payments table is not listed. Line 5 specifies an extra "Display" field that is to be shown whenever one or more Account records appear in a list context. While "Status" is not part of the primary key and would thus not be displayed when a list of a Customer's Accounts is shown, Account Status is a potentially relevant fact that might aid a user in determining which records to explore. For example, closed accounts may not be of interest at a particular time of using the system or method. Line 7 will generate a link to Google® Maps™ to display a map of the zip code for any Address record. Line 11 states that when Services are listed, they are to be sorted by ServiceName. Line 12 spells out a "soft relationship" between Address and AddressType.

Given the above database and configuration file, a sample user session might proceed as follows. The screen images discussed below are only examples, not limiting to a particular user interface or display. Details of example interfaces will be discussed in further detail below.

Figure 3:
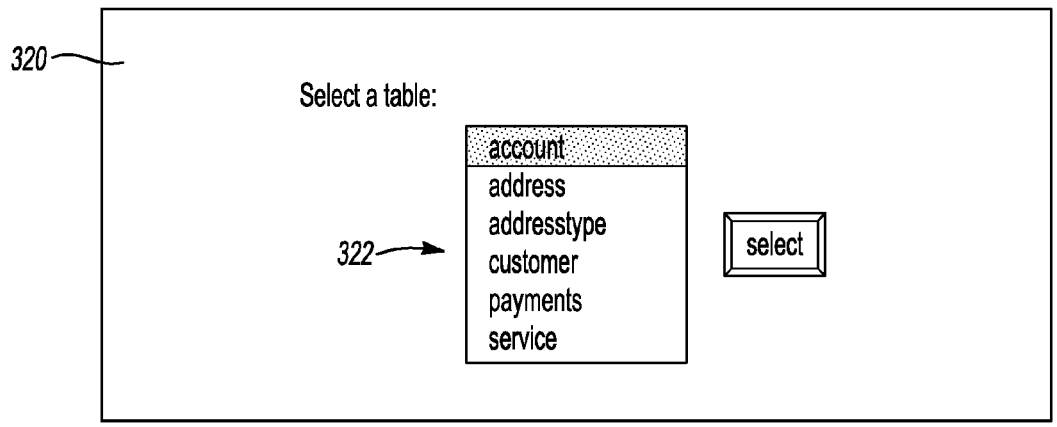
FIG. 3 is a schematic diagram depicting a Graphical User Interface (GUI) display of an example introductory interface according to the present disclosure.

In an example user session, to begin, a user points a browser to a designated URL for browsing the database. Upon identification of the database, an introductory interface displays the tables listed in the configuration file. FIG. 3 shows an example introductory interface 320 as a table selection screen. The user selects a table of interest from the list of tables 322. Here, any of "account", "address", "addresstype", "customer", "payments", or "service" may be selected.

Continuing with this example, the user selects the "customer" table. Next, the system reads the metadata to determine which sets of fields are indexed on that table. From the "Customer" table metadata, the system discovers the primary key (which is always indexed) and the alternate index of LastName+FirstName. As depicted in the example key values prompt 330 in FIG. 4, the system displays prompts for each. The user may employ either index to search for records, as shown by continued discussion of FIG. 4 below.

Figure 4:
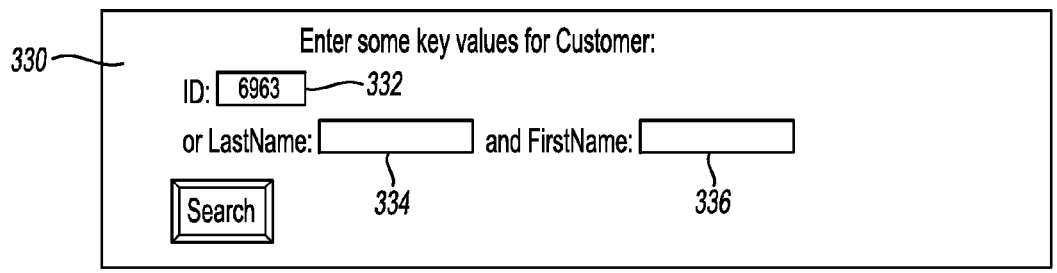
FIG. 4 is a schematic diagram depicting a GUI display of an example key values prompt interface according to the present disclosure.
Figure 5:
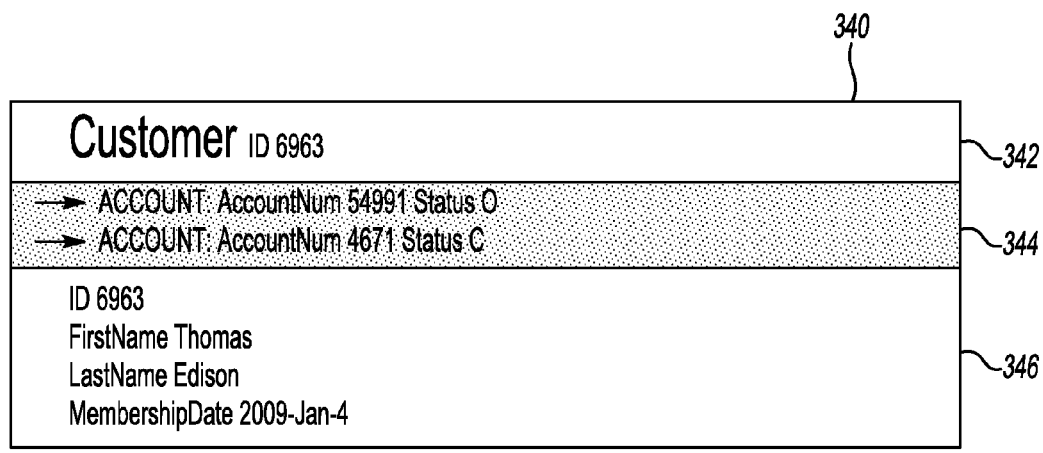
FIG. 5 is a schematic diagram depicting a GUI display of an example main screen interface according to the present disclosure.

FIG. 4 shows a key values prompt 330 including fields for record searching by the indexed information. There is a field for searching by ID 332 and fields for searching by Last Name 334 and First Name 336. Here, when the user enters either an ID or a LastName+FirstName pair, the main screen for the identified record is displayed. According to this example, the main screen is depicted as shown in FIG. 5 for Customer having ID 6963. If multiple records matched the selection criteria entered on the prior screen, for example because the user searched by name, and there are two customers named John Smith, all matching records would be displayed. It is to be understood that where multiple records are selected for coincidental display, the GUI represents each with all of their related information as discussed for the main screens 340, 340' and 340" below.

With reference to FIG. 5, the main screen 340 for display of a record is comprised of a header 342, a middle section 344, and a bottom section 346. The header 342 at the top of the main screen 340 shows the keys for the record. The middle section 344 lists related items, each one noted with an arrow symbol (e.g., "→"). The detail section 346 at the bottom shows the values of each attribute in the table (i.e., each column in that table). Here, the header indicates that the main screen 340 is for a customer, this customer having the ID of 6963. The middle section shows that there are two related items indicated by the arrow symbol "→", each here are records of accounts. Along the line for each related record is the record's table name, here "ACCOUNT", and any other displayed information to be specified as added or subtracted for display by the configuration file.

If the user wants to learn more about account 54991, the user can click anywhere on the "→" line for that account, and the display will update to show the details of account 54991 along with the related items for account 54991. See FIG. 6 for an example main screen 340' for Account representing AccountNum 54991.

Figure 6:
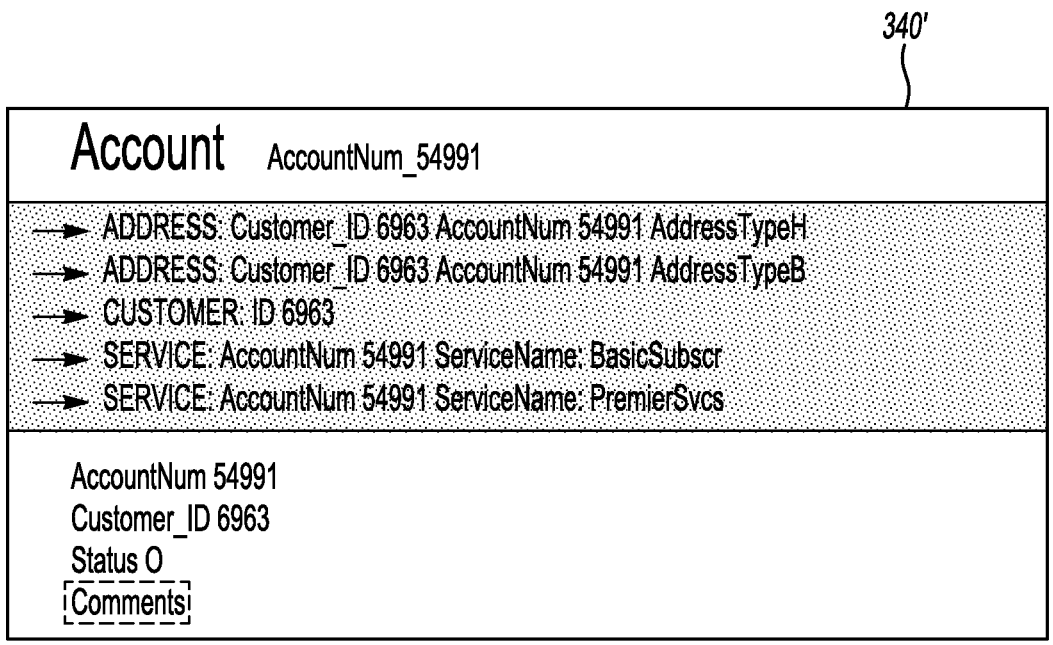
FIG. 6 is a schematic diagram depicting a screenshot of another example main screen interface according to the present disclosure.

As depicted in FIG. 6 for Account 54991, the main screen 340' includes the keys, related items, and details of the account shown in the display. In this example, there are five related records shown on the main screen 340'. The account is related to Customer 6963, as is understood because the user just navigated here using that relationship, so that relationship is shown, as well as relationships to two different addresses (one H type, one B type) and two services that this customer has purchased.

While the data model shows that the table "Payments" is related to the table "Accounts", no information from Payments is shown. "Payments" was not listed in the configuration file as being a table of interest, so no information from "Payments" displayed even if such relationships exist for the current Account. Simply put, the configuration file stated (by omission) that Payment information was out of scope. This is an example of filtering information, using the configuration file to make customizations.

"Services", however, was specified as being in scope, and data from two records are shown. If the customer had not ordered any services, no hyperlinks would be shown for "Service" details. The system and method as disclosed herein are capable of handling such optional relationships. In this example, the "Comments" field is optional as represented by hidden lines around "Comments" in the figure. The hidden lines are a special visual designation for fields which are set to NULL. This may also be done for example by making the text gray to distinguish from other fields not set to NULL. For example, if there were no services, the "Service" field would be grayed out.

Figure 7:
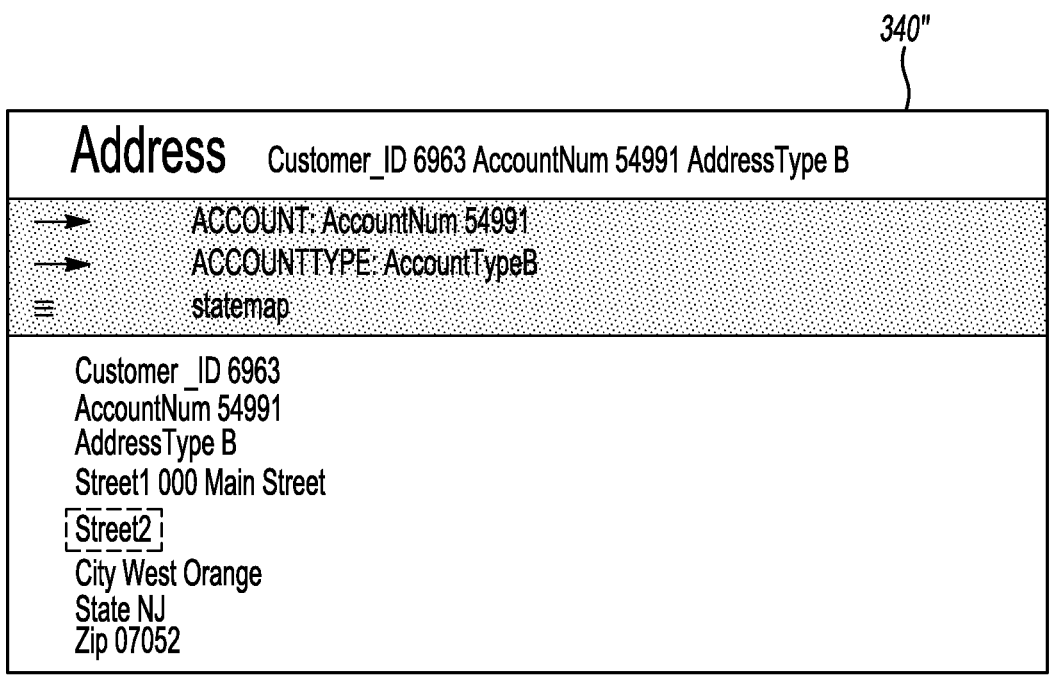
FIG. 7 is a schematic diagram depicting a GUI display of still another example main screen interface according to the present disclosure.

Still referring to FIG. 6, selection of the type B address causes a display of an "Address" main screen 340", in this example depicted in FIG. 7. Shown is a main screen 340" for "Address", specific to Customer_ID 6963.

This display includes a special "external" hyperlink, per a URL directive in the configuration file. In the display, an external hyperlink may be indicated by a designated symbol, for example as shown in FIG. 7, three horizontal lines, one on top of the next preceding the word "statemap". In this example, the configuration file line includes a URL directive as follows:
URL: statemap, http://maps.google.com/maps?q=[Zip]&z=6

When a user clicks on the "statemap" hyperlink, the zip code from the current record, 07052 in this case, is substituted for the placeholder [Zip] from the directive, yielding the URL: http://maps.google.com/maps?q=07052&z=6.

Figure 8:
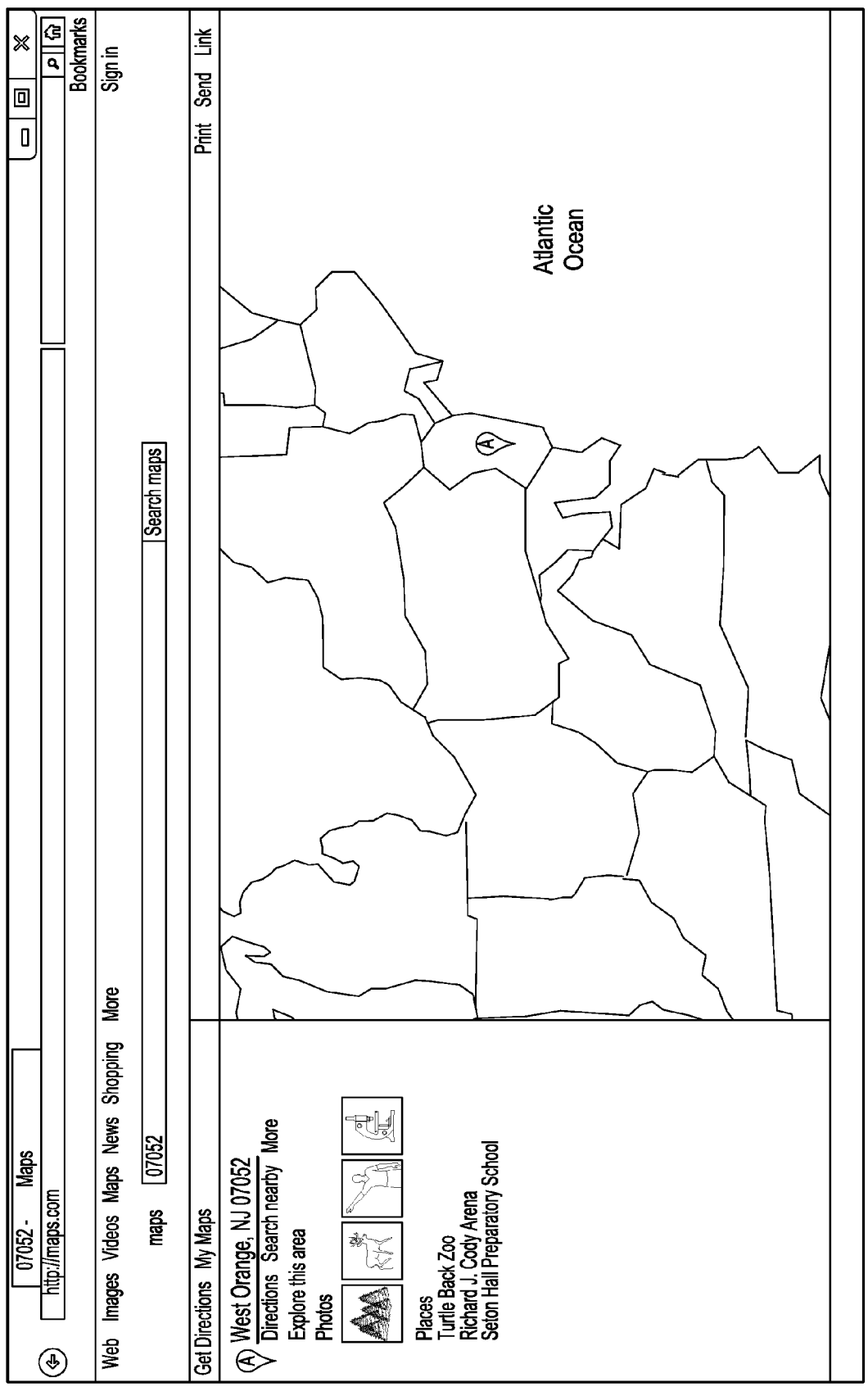
FIG. 8 is a schematic diagram depicting a GUI display of an example of a website provided by an external link according to the present disclosure.

Here, clicking on the hyperlink opens Google® Maps™ in a new window, showing the location of that zip code as depicted in FIG. 8.

It is to be understood that other types of hyperlinking may be used, for example using a map application such as Google® Maps™, a satellite image may be used instead of a street map. Additionally, hyperlinks may be provided to look up data in online databases, to dive into a web based diagnostic tool on the company intranet, to compose an email to an address from the database, etc. Another example of hyperlinking would be to include reference to a product manual showing an image or information related to a product of interest by linking to the source URL as specified within the configuration file. For instance: hftp://ownersmanuals.com/view/product=[&Model]

It is to be understood that the URL above, as similar to the Google® Maps™ reference, includes a placeholder (here "[&Model]") where the database would supply the model identifier for replacement, linking the user upon a selection of the URL to the product manual for the product of interest.

In a related example, assuming a business was using the database described above, it might happen that the customer service department experiences some sort of problem using their customer order software. The customer service representative might report having an issue trying to enter an order for customer 6963, who wants to order the "PremiumPlus" package. Using the system and method as disclosed herein, a user might quickly pull up that customer's record, explore the data, and ascertain that the customer has two accounts, and that the closed account has a "B" address in a state where the PremiumPlus service is not offered. The user could report back that the use of the address from the closed account is a software bug.

The equivalent SQL that might be used to perform the same amount of discovery is shown below.

```
--Display customer details
   select * from customer where ID=6963
--What accounts does the customer have?
   select ac.*
   from customer c join account ac using (ac.Customer_ID=c.ID)
   where c.ID=6963
--Show addresses for the account 54991
   select ad.*
   from account ac join address ad on (Customer_ID, Account-
Num)
   where Customer_ID = 6963
   and AccountNum = 54991
--Show services for the account 54991
   select s.*
   from account ac join service s on (AccountNum)
   where AccountNum = 54991
```

Coding the SQL to get the desired details clearly requires some knowledge of the underlying tables and how they relate. It also requires knowledge of the indexes on each table, the foreign keys, the exact spelling of table and columns names (e.g., "is it AccountNum or Account_ID, or is it AccountID"?). The coder must also know the syntax of the SQL language itself.

It is to be understood use of the words "a" and "an" and other singular referents may include plural as well, both in the specification and claims, unless the content clearly indicates otherwise.

It is also to be understood that the ranges provided herein include the stated range and any value or sub-range within the stated range. For example, a range from about 5000 to about 100000 should be interpreted to include not only the explicitly recited limits of about 5000 to about 100000, but also to include individual values, such as 10000, 22000, 60000, 89000, etc., and sub-ranges, such as from about 5000 to about 20000, from about 10000 to about 40000, etc. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

The invention claimed is:

1. A method of enabling browsing of database tables on a computer system, the method comprising:
providing a configuration file by a database administrator without an end user supplied configuration to automatically identify database table characteristics and to automatically develop a graphical user interface (GUI) in communication with a database, wherein the GUI display is automatically built without application programming by the end user, wherein:
the database administrator is a person distinct from the end user;
the configuration file defines a filter for displayed information;
the filter passes a predetermined database table or detail; and the configuration file includes data that is supplemental to metadata of the database, the data including a set of soft relationships;

displaying on the GUI a main screen responsive to the configuration file, including:
 a record as a row from the predetermined database table;
 a related database table name, the related database table name being related to the predetermined database table;
 a detail as a value in a column from the predetermined database table for the record displayed; and
 external hyperlinks, the external hyperlinks created from information in the configuration file and in the database wherein the external hyperlinks are extra-referential to an other database or an internet site;

receiving a selection from the GUI of the table; and navigating to an other main screen on the GUI in response to the selection from the GUI.

2. The method of claim 1 wherein navigation within the GUI treats the database as read-only.

3. The method of claim 1 wherein the GUI is browser based.

4. The method of claim 1 wherein the configuration file includes additional fields to display when listing related rows.

5. The method of claim 1 wherein the configuration file includes a relationship having a character string including more characters than a predetermined limit of characters for a string in metadata.

6. The method of claim 1, further comprising redacting from the display predetermined types of sensitive information to avoid unauthorized display of the sensitive information.

7. The method of claim 1, further comprising providing a sort order for display in the GUI.

8. The method of claim 1, further comprising extracting information from a large object (LOB) for display of a field with the LOB.

9. The method of claim 1 wherein the configuration file lists a one-way relationship between database tables.

10. The method of claim 1, further comprising providing an other configuration file associated with the database.

11. The method of claim 10, further comprising linking to the other configuration file in response to the selection from the GUI of a link associated with the other configuration file.

12. A system enabling database browsing, comprising:
a network;
a processor coupled to the network; and
a system memory coupled to the processor, wherein the system memory stores a computer program executable by the processor, the program including computer readable code encoded on a non-transitory, tangible computer readable medium, the computer readable code to:
 place a graphical user interface (GUI) in selective communication with a database having one or more database tables;
 select one of the database tables in response to an end user input, the selected database table containing an item chosen from records, attributes, and relationships;
 selectively display the item on the GUI; and
 associate a configuration file with the database, the configuration file further including instructions to automatically:
  search database metadata to establish the item;
  define the database tables;
  select the item to display; and
  define soft relationships and external hyperlinks for incorporation into the GUI wherein the configuration file is provided by a database administrator without the end user supplied configuration to identify database table characteristics and to develop the GUI in communication with the database, wherein the GUI display is built without application programming by the end user wherein:
   the database administrator is a person distinct from the end user;
   the configuration file includes data that is supplemental to metadata of the database;
   the external hyperlinks are created from information in the configuration file and in the database; and
   the external hyperlinks are extra-referential to an other database or an internet site.

13. The method of claim 1 wherein application programming includes developing a GUI display or pre-writing screens with menus.

14. The system of claim 12 wherein application programming includes developing a GUI display or pre-writing screens with menus.

15. The method of claim 1 wherein the external hyperlinks are automatically programmable Uniform Resource Locator (URL) specifications in the configuration file to automatically allow the end user to navigate to an internet site that automatically applies data from the record.

16. The system of claim 12 wherein the external hyperlinks are automatically programmable Uniform Resource Locator (URL) specifications in the configuration file to automatically allow the end user to navigate to an internet site that automatically applies data from the selected database table or the configuration file.

* * * * *